US010391542B2

(12) United States Patent
Hagiwara et al.

(10) Patent No.: US 10,391,542 B2
(45) Date of Patent: Aug. 27, 2019

(54) METHOD FOR MANUFACTURING ROLLING BEARING UNIT AND METHOD FOR MANUFACTURING VEHICLE

(71) Applicant: NSK Ltd., Tokyo (JP)

(72) Inventors: Nobuyuki Hagiwara, Fujisawa (JP); Kazuto Kobayashi, Fujisawa (JP); Isao Shintou, Fujisawa (JP); Hiroshi Koyama, Fujisawa (JP); Toshio Nakamura, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/570,535

(22) PCT Filed: Jul. 4, 2016

(86) PCT No.: PCT/JP2016/069763
§ 371 (c)(1),
(2) Date: Oct. 30, 2017

(87) PCT Pub. No.: WO2017/006901
PCT Pub. Date: Jan. 12, 2017

(65) Prior Publication Data
US 2018/0169735 A1  Jun. 21, 2018

(30) Foreign Application Priority Data

Jul. 6, 2015 (JP) .................. 2015-134992

(51) Int. Cl.
*B60B 27/00* (2006.01)
*B23B 51/00* (2006.01)
(Continued)

(52) U.S. Cl.
CPC .............. *B21D 53/10* (2013.01); *B21J 9/025* (2013.01); *B21K 1/30* (2013.01); *B21K 1/40* (2013.01);
(Continued)

(58) Field of Classification Search
CPC ........ B21D 53/10; F16C 19/186; F16C 43/04; F16C 2326/02
See application file for complete search history.

(56) References Cited

U.S. PATENT DOCUMENTS

| 9,180,639 B2 * | 11/2015 | Ferrero ................. B21K 21/12 |
| 2013/0181375 A1 | 7/2013 | Ferrero et al. |
| 2014/0100044 A1 | 4/2014 | Kimura et al. |
| 2015/0231920 A1 | 8/2015 | Matsunaga et al. |

FOREIGN PATENT DOCUMENTS

| CN | 1084616 A | 3/1994 |
| CN | 1223346 A | 7/1999 |

(Continued)

OTHER PUBLICATIONS

International Search Report of PCT/JP2016/069763 dated Aug. 30, 2016 [PCT/ISA/210].

(Continued)

*Primary Examiner* — Rick K Chang
(74) *Attorney, Agent, or Firm* — Sughrue Mion, PLLC

(57) ABSTRACT

A method for manufacturing a rolling bearing unit is provided to periodically reciprocate a stage (38) in a vertical direction by rotating and driving a servo motor (44) while rotating a roll about a central axis of a hub main body using a roll driving motor (43) in a state in which a processing surface of the roll is pressed against other end surface of a caulking section in an axial direction. A period of the reciprocation is restricted by a relation between a rotation position of the roll about the central axis of the hub main body and an engaged state between concave sections, which are sections between a plurality of processed teeth formed in the processing surface of the roll, and a face spline tooth formed by the concave section.

8 Claims, 9 Drawing Sheets

(51) Int. Cl.
   *B21D 53/10* (2006.01)
   *B21K 1/40* (2006.01)
   *F16C 43/04* (2006.01)
   *B21J 9/02* (2006.01)
   *B21K 1/30* (2006.01)
   *B21K 1/76* (2006.01)
   *F16D 1/076* (2006.01)
   *F16C 19/18* (2006.01)
   *F16C 35/063* (2006.01)

(52) U.S. Cl.
   CPC .............. *B21K 1/765* (2013.01); *B23B 51/00* (2013.01); *B60B 27/00* (2013.01); *B60B 27/0031* (2013.01); *B60B 27/0084* (2013.01); *F16C 43/04* (2013.01); *F16D 1/076* (2013.01); *F16C 19/186* (2013.01); *F16C 35/063* (2013.01); *F16C 2226/52* (2013.01); *F16C 2226/60* (2013.01)

(56) References Cited

FOREIGN PATENT DOCUMENTS

| | | |
|---|---|---|
| CN | 1572420 A | 2/2005 |
| EP | 2551031 A1 | 1/2013 |
| EP | 2551033 A1 | 1/2013 |
| EP | 2551034 A1 | 1/2013 |
| JP | 02197345 A | 8/1990 |
| JP | 2009-292422 A | 12/2009 |
| JP | 2013-000781 A | 1/2013 |
| JP | 2014-077527 A | 5/2014 |
| JP | 2015-077616 A | 4/2015 |

OTHER PUBLICATIONS

Communication dated Jan. 3, 2019, from State Intellectual Property Office of the P.R.C. in counterpart application No. 201680039644.9.
Communication dated Feb. 12, 2019, from European Patent Office in counterpart application No. 16821370.0.

* cited by examiner ments 5 and 5 are rollably installed between both of the outer ring tracks 7a and 7b and both of the inner ring tracks 11a and 11b such that the plurality of rolling elements are disposed in each of the rows.

METHOD FOR MANUFACTURING ROLLING BEARING UNIT AND METHOD FOR MANUFACTURING VEHICLE

CROSS REFERENCE TO RELATED APPLICATIONS

This application is a National Stage of International Application No. PCT/JP2016/069763, filed Jul. 4, 2016, claiming priority based on Japanese Patent Application No. 2015-134992, filed Jul. 6, 2015, the contents of all of which are incorporated herein by reference in their entirety.

TECHNICAL FIELD

The present invention relates to a method for manufacturing a rolling bearing unit used as a wheel-supporting rolling bearing unit that constitutes a wheel-driving bearing unit in combination with, for example, a constant velocity joint.

BACKGROUND ART

FIG. 5 shows an example of a conventional structure of a wheel-driving bearing unit in which a wheel-supporting rolling bearing unit disclosed in Patent Literature 1 is incorporated. The wheel-driving bearing unit shown in FIG. 5 is formed by combining a wheel-supporting rolling bearing unit 1 and an outer ring 2 for a constant velocity joint. The wheel-supporting rolling bearing unit 1 includes an outer ring 3, a hub 4, and a plurality of rolling elements (in the example shown, balls) 5 and 5.

The outer ring 3 has a stationary-side flange 6 formed on an outer circumferential surface thereof, and a plurality of rows of outer ring tracks 7a and 7b formed on an inner circumferential surface thereof.

The hub 4 is formed by combining a hub main body 8 and an inner ring 9. The hub main body 8 has a rotation-side flange 10 formed on a portion of the outer circumferential surface of hub main body 8 close to one end in an axial direction. In addition, the hub main body 8 has an inner ring track 11a formed on an intermediate section of the outer circumferential surface in the axial direction, at one side in the axial direction. In addition, the hub main body 8 has a small diameter step section 12 formed on the other end portion of the outer circumferential surface in the axial direction, and a center hole 13 formed in a central section thereof.

Further, in the specification and claims, "one side" in the axial direction refers to an outside in a widthwise direction of a vehicle in a state in which a bearing is attached to an automobile. That is, a left side of FIG. 5 and a lower side of FIG. 6 are referred to as "one side" in the axial direction, and on the other hand, a right side of FIG. 5 and an upper side of FIG. 6, which are central sides in the vehicle when a bearing is attached to an automobile are referred to as "the other side" in the axial direction.

A small diameter section 14 through which a rod section 16 of a bolt 15 serving as a coupling member can be inserted via a predetermined guiding clearance is formed in one end portion of the center hole 13 in the axial direction.

The inner ring 9 has an inner ring track 11b formed on the other side of the outer circumferential surface in the axial direction, and is fastened and fixed onto the small diameter step section 12 of the hub main body 8.

The rolling elements 5 and 5 are rollably installed between both of the outer ring tracks 7a and 7b and both of the inner ring tracks 11a and 11b such that the plurality of rolling elements are disposed in each of the rows.

In this state, a caulking section 20 is formed by plastically deforming a portion of a cylindrical section 19, formed on the other end portion of the hub main body 8 in the axial direction, protruding from the other end opening of the inner ring 9 in the axial direction outward in the radial direction. An appropriate preload is applied to the rolling elements 5 and 5 by pressing the other end surface of the inner ring 9 in the axial direction with the caulking section 20.

A hub-side face spline 21 that is a concavo-convex section in the circumferential direction is formed on the other end surface of the caulking section 20 in the axial direction throughout the circumference.

Further, in the case of the example shown, a tooth tip surface of the hub-side face spline 21 is made as a plane perpendicular with respect to a central axis of the hub main body 8.

The outer ring 2 for a constant velocity joint has a cup-shaped mouth section 22, an end wall section 23 that is a bottom section of the mouth section 22, and a cylindrical shaft section 24 extending from a central section of the end wall section 23 toward one side in the axial direction. A center hole of the shaft section 24 is a screw hole 25.

A joint-side face spline 26 that is a concavo-convex section in the circumferential direction is formed on a portion close to an outer circumference of one end surface of the end wall section 23 in the axial direction throughout the circumference.

Further, in the case of the example shown, a tooth tip surface of the joint-side face spline 26 is made as a plane perpendicular to the central axis of the outer ring 2 for a constant velocity joint. In addition, the number of teeth of the joint-side face spline 26 is the same as the number of teeth of the hub-side face spline 21.

Then, in a state in which central axes of the hub main body 8 and the outer ring 2 for a constant velocity joint coincide with each other, as the face splines 21 and 26 of both of the hub-side and the joint-side are meshed with each other, transmission of a rotating force between the hub main body 8 and the outer ring 2 for a constant velocity joint are realized. In addition, in this state, the rod section 16 of the bolt 15 is inserted through the small diameter section 14 of the center hole 13 of the hub main body 8 from one side in the axial direction and a male screw portion 17, formed on a tip portion of the rod section 16, is screwed into the screw hole 25 for further fastening. Accordingly, in a state in which the hub main body 8 is disposed between a head portion 18 of the bolt 15 and the outer ring 2 for a constant velocity joint, the hub main body 8 and the outer ring 2 for a constant velocity joint are coupled and fixed.

When the wheel-driving bearing unit configured as above is assembled in the vehicle, a rotary member for brake such as a wheel (a driving wheel), a disk, and so on, are supported by and fixed to the rotation-side flange 10 of the hub main body 8 while the stationary-side flange 6 of the outer ring 3 is coupled and fixed to a suspension system. In addition, a tip portion of a drive shaft (not shown), rotated and driven by an engine via a transmission, is spline-coupled to an inside of an inner ring 27 for a constant velocity joint installed inside of the outer ring 2 for a constant velocity joint. During traveling of an automobile, rotation of the inner ring 27 for a constant velocity joint is transmitted to the outer ring 2 for a constant velocity joint and the hub main body 8 via a plurality of balls 28 to rotate and drive the wheel.

When the wheel-supporting rolling bearing unit 1 that constitutes the wheel-driving bearing unit configured as above is assembled, first, the outer ring 3 is disposed around the hub main body 8, and the rolling elements 5 and 5 are installed in a state held by a holder 29a disposed at one side in the axial direction in between the outer ring track 7a at the outer ring tracks 7a and 7b of one side in the axial direction and the inner ring track 11a at the one side in the axial direction. Next, the rolling elements 5 and 5 are installed in a state held by a holder 29b disposed at the other side in the axial direction in the surroundings of the inner ring track 11b of the other side in the axial direction formed on the outer circumferential surface of the inner ring 9, and in this state, the inner ring 9 is fastened and fitted onto the small diameter step section 12 formed on the other end portion of the hub main body 8 in the axial direction. Then, according to the on-fitting work, rolling contact surfaces of the rolling elements 5 and 5 (at the other side row in the axial direction) held by the holder 29b at the other side in the axial direction are made to abut the outer ring track 7b at the other side in the axial direction and formed on an inner circumferential surface of a portion close to the other end of the outer ring 3 in the axial direction. Next, the cylindrical section 19 formed on the other end portion of the hub main body 8 in the axial direction is plastically deformed outward in the radial direction to form the caulking section 20. Then, the inner ring 9 is fixed to the hub main body 8 by pressing in the axial direction the other end surface of the inner ring 9 in the axial direction with the caulking section 20.

Further, as shown in FIG. 6, the hub-side face spline 21 is formed on the other end surface of the caulking section 20 in the axial direction by performing rotary forging using a roll 30 having a central axis β inclined with respect to a central axis (a central axis of the wheel-supporting rolling bearing unit 1) α of the hub main body 8 by a predetermined angle θ.

Further, in FIG. 6, members except for the hub main body 8 (the outer ring 3, the rolling elements 5 and 5, the inner ring 9, and so on) among members that constitute the wheel-supporting rolling bearing unit 1 are omitted. A tip surface (a lower end surface of FIG. 6) of the roll 30 forms a processing surface 31 in which a concave section 34 and convex sections 33 and 33 (see FIG. 9) are alternately disposed throughout the circumference thereof. In a state in which the processing surface 31 of the roll 30 is pressed toward the other end surface of the caulking section 20 in the axial direction, the roll 30 is rotated about the central axis α of the hub main body 8.

Here, the roll 30 is rotatably supported about a central axis β thereof. Accordingly, in a state before the hub-side face spline 21 (i.e., a concavo-convex section in the circumferential direction that will serve as the hub-side face spline 21) is formed on the other end surface of the caulking section 20 in the axial direction, when the roll 30 is rotated about the central axis α of the hub main body 8, the roll 30 is rotated self-rotation) about the central axis β thereof on the basis of frictional engagement between tip surfaces of the convex sections 33 and 33 formed on the processing surface 31 and the other end surface of the caulking section 20 in the axial direction. On the other hand, after the hub-side face spline 21 is formed to a certain extent (i.e., a tooth depth of the hub-side face spline 21 is large to a certain extent), when the roll 30 is rotated about the central axis α of the hub main body 8, the roll 30 self-rotates on the basis of engagement (meshing) between the concave section 34 and the convex sections 33 and 33 that constitute the processing surface 31 and the hub-side face spline 21. According to this configuration, as the caulking section 20 is plastically deformed by pressing the processing surface 31 of the roll 30 toward the other end surface of the caulking section 20 in the axial direction, the hub-side face spline 21 is formed on the other end surface of the caulking section 20 in the axial direction, and further, a tooth depth of the hub-side face spline 21 is increased to complete the processing.

A method for manufacturing the above-mentioned wheel-supporting rolling bearing unit 1 has room for improvement from an aspect of suppressing manufacturing cost while securing durability of the wheel-supporting rolling bearing unit 1. That is, work of forming the hub-side face spline 21 (rotary forging) is performed by rotating the roll 30 about the central axis α of the hub main body 8 in a state in which the processing surface 31 of the roll 30 is pressed against the other end surface of the caulking section 20 in the axial direction with a large force (pressing force) F.

During such rotary forging, when an inclined angle θ of the central axis β of the roll 30 with respect to the central axis α of the hub main body 8 is small, an abutting area between the processing surface 31 of the roll 30 and the other end surface of the caulking section 20 in the axial direction, i.e., an abutting area between the tip surfaces of the convex sections 33 and 33 that constitute the processing surface 31 and the other end surface of the caulking section 20 in the axial direction, is increased.

As a result, a load (i.e., an abutting surface pressure between the tip surfaces of the convex sections 33 and 33 and the other end surface of the caulking section 20 in the axial direction) applied from the tip surfaces of the convex sections 33 and 33 to the other end surface of the caulking section 20 in the axial direction (i.e., a portion of the other end surface of the caulking section 20 in the axial direction that will serve as a tooth bottom of the hub-side face spline 21) decreases.

Accordingly, when the inclined angle θ is small, a load applied from the tip surfaces of the convex sections 33 and 33 to the other end surface of the caulking section 20 in the axial direction should be secured by increasing the pressing force F.

FIG. 7 shows a relation between the inclined angle θ and a maximum value of the pressing force F. As apparent from FIG. 7, when the inclined angle θ is 5°, the pressing force should have a value that is twice that when the inclined angle θ is 15°. When the pressing force F is increased, a processing apparatus used for the rotary forging is increased in size, and thus manufacturing cost is increased.

On the other hand, when the inclined angle θ is increased, straightness of a cross-sectional shape of a tooth surface of a tooth 32 (a side surface of a tooth) that constitutes the hub-side face spline 21 is decreased. Reasons for this will be described below. When the number of convex sections 33 and 33 that constitute the processing surface 31 of the roll 30 is set equal to the number of teeth 32 that constitute the hub-side face spline 21, and it is assumed that, when rotary forging is performed on the other end surface of the caulking section 20 in the axial direction, a sliding in the circumferential direction of the engaging section between the processing surface 31 and the other end surface of the caulking section 20 in the axial direction does not occur, arbitrary points P on the processing surface 31 of the roll 30 draw a closed loop shaped trajectory. The trajectory drawn by the points P during the rotary forging will be described with reference to FIG. 6.

First, it is assumed that the point P is on an engaging section (a point $P_0$ in FIG. 6) with the other end surface of the caulking section 20 in the axial direction. Coordinates $P_0(x_1, y_1, z_1)$ of the point $P_0$ are represented by the following equation (1) in a rotation coordinate system $(x_1, y_1, z_1)$ in which an origin is set at an intersection between the central axis α of the hub main body 8 and the central axis β of the roll 30, and among an $x_1$ axis, a $y_1$ axis and a $z_1$ axis that are perpendicular to each other, the $y_1$ axis coincides with a front-rear direction of FIG. 6 and the $z_1$ axis coincides with the central axis β of the roll 30.

[Math. 1]

$$P_0(x_1, y_1, z_1) = \begin{bmatrix} L\cos\theta \\ 0 \\ L\sin\theta - d \end{bmatrix} \quad (1)$$

Further, θ in the equation (1) represents an inclined angle of the central axis β of the roll 30 with respect to the central axis α of the hub main body 8 (an angle formed between the central axis α and the central axis β), d represents a distance between an intersection between the central axis α and the central axis β and in intersection between the central axis β and the other end surface of the caulking section 20 in the axial direction (a distance in the axial direction of the central axis β), and L represents a distance between the point $P_0$ and an intersection between the central axis β and the other end surface of the caulking section 20 in the axial direction (a distance in the radial direction).

During the rotary forging, the roll 30 is rotated (self-rotation) about the central axis β (the $z_1$ axis) thereof. Coordinates $P_A(x_1, y_1, z_1)$ of a point $P_A$ in the rotation coordinate system obtained by rotating the point $P_0$ by an angle λ around the $z_1$ axis are represented as the following equation (2).

[Math. 2]

$$P_A(x_1, y_1, z_1) = \begin{bmatrix} \cos\lambda & -\sin\lambda & 0 \\ \sin\lambda & \cos\lambda & 0 \\ 0 & 0 & 1 \end{bmatrix} \begin{bmatrix} L\cos\theta \\ 0 \\ L\sin\theta - d \end{bmatrix} = \begin{bmatrix} L\cos\lambda\cos\theta \\ L\sin\lambda\cos\theta \\ L\sin\theta - d \end{bmatrix} \quad (2)$$

The coordinates $P_A(x_1, y_1, z_1)$ of the point $P_A$ in the rotation coordinate system are represented (converted) with a rotation coordinate system $(x, y, z)$ in which an origin is set at an intersection between the central axis α and the central axis β, and among an x axis, a y axis and a z axis that are perpendicular to each other, the y axis is set to coincide with the front-rear direction of FIG. 6 and the z axis is set to coincide with the central axis α of the hub main body 8, to yield the following equation (3).

[Math. 3]

$$P_A(x, y, z) = \begin{bmatrix} \cos\theta & 0 & \sin\theta \\ 0 & 1 & 0 \\ -\sin\theta & 0 & \cos\theta \end{bmatrix} \begin{bmatrix} L\cos\lambda\cos\theta \\ L\sin\lambda\cos\theta \\ L\sin\theta - d \end{bmatrix} = \begin{bmatrix} L\cos\lambda\cos^2\theta + L\sin^2\theta - d\sin\theta \\ L\sin\lambda\cos\theta \\ -L\cos\lambda\cos\theta\sin\theta + L\sin\theta\cos\theta - d\cos\theta \end{bmatrix} \quad (3)$$

Here, the right side of the equation (3) is replaced with (X, Y, Z).

Meanwhile, during the rotary forging, the roll 30 is rotated about the central axis α of the hub main body 8. A rotation angle of the roll 30 about the central axis α (the z axis) when the roll 30 is rotated about the central axis β (the $z_1$ axis) thereof by an angle λ is assumed to be ϕ. Coordinates $P_B(x, y, z)$ of a point $P_B$ in the rotation coordinate system obtained by rotating the point $P_A$ around the z axis by an angle ϕ are represented as the following equation (4).

[Math. 4]

$$P_B(x, y, z) = \begin{bmatrix} \cos\phi & -\sin\phi & 0 \\ \sin\phi & \cos\phi & 0 \\ 0 & 0 & 1 \end{bmatrix} \begin{bmatrix} X \\ Y \\ Z \end{bmatrix} = \begin{bmatrix} X\cos\phi - Y\sin\phi \\ X\sin\phi + Y\cos\phi \\ Z \end{bmatrix} \quad (4)$$

Here, provided that sliding in the circumferential direction is not generated in the engaging section between the processing surface 31 and the other end surface of the caulking section 20 in the axial direction, a relation between a rotation angle ϕ of the roll 30 about the central axis α of the hub main body 8 and a rotation angle λ of the roll 30 about the central axis β thereof is represented as the following equation (5).

[Math. 5]

$$-\phi = \frac{L\cos\theta}{R} \cdot \lambda \quad (5)$$

Further, R in the equation (5) represents a distance (a distance in the radial direction) between the point $P_0$ and the central axis α.

When the equation (5) is substituted into the equation (4) and the rotation angle ϕ of the roll 30 about the central axis α is varied from 0 to 360 degrees, during the rotary forging, a trajectory T drawn by the point P on the processing surface 31 of the roll 30a can be obtained.

Specifically, the trajectory T drawn by the point P in the y-z plane (when seen in a direction of the x axis) has, for example, a reversed teardrop shape shown in FIG. 8. A trajectory $T_5$ in FIG. 8 represents a trajectory drawn by the point P when the inclined angle θ is 5°, the distance R is 21.31 [mm], the distance L is 21.39 [mm], and the distance d is 0.93 [mm]. On the other hand, the trajectory $T_{15}$ in FIG. 8 represents a trajectory drawn by point P when the inclined angle θ is 15°, the distance R is 21.31 [mm], the distance L is 22.06 [mm], and the distance d is 2.9 [mm].

As apparent from FIG. 8, when the inclined angle θ is increased, the trajectory T drawn by the point P (an area of a portion surrounded by the trajectory T) is increased (in particular, a width in a y direction is increased). Here, when the width of the trajectory T in the y direction is increased, displacement of the point P in the y direction according to rotation of the roll 30 about the central axis α is increased, and straightness of a cross-sectional shape of the tooth surfaces of the teeth 32 that constitute the hub-side face spline 21 is decreased.

That is, in the case of the method for manufacturing the wheel-supporting rolling bearing unit 1 in the related art, in a state in which a central position of the one concave section 34 (a central position of the roll 30 in the circumferential direction) of the plurality of concave sections 34 that constitute the processing surface 31 of the roll 30 is pressed toward the other end surface of the caulking section 20 in the axial direction (a state in which a virtual line γ parallel to the central axis β of the roll 30 and passes through a central position of the one concave section 34 is present in a virtual plane including the central axis α of the hub main body 8 and the central axis β thereof), as shown in FIG. 9(C), the tooth surface of the tooth 32 formed by the one concave section 34 (i.e., a side surface of the convex section in the circumferential direction that will serve as the tooth 32) is parallel to a side surface of the one concave section 34 in the circumferential direction when it abuts the tooth surface of the tooth 32.

When the roll 30 is rotated (revolved) about the central axis α from this state, the side surface of the one concave section 34 in the circumferential direction is inclined with respect to the tooth surface of the tooth 32 formed by the one concave section 34 (i.e., a side surface of the convex section in the circumferential direction that will serve as the tooth 32). An inclined angle of the side surface of the one concave section 34 in the circumferential direction with respect to the tooth surface of the tooth 32 is maximally increased in a state in which a central position of one convex section 33 in the plurality of convex sections 33 and 33 that constitute the processing surface 31 of the roll 30 is pressed toward the other end surface of the caulking section 20 in the axial direction {a state shown in FIG. 9(B) or 9(D)}. When the inclined angle is increased, the side surface of the one concave section 34 in the circumferential direction abuts the tooth surface of the tooth 32 locally, and the tooth surface of the tooth 32 is locally plastically deformed.

FIG. 10 is a schematic view showing a face spline tooth formed by rotary forging, FIG. 10(A) is a schematic view when an inclined angle of the central axis of the roll with respect to the central axis of the hub main body is 5°, and FIG. 10(B) is a schematic view when an inclined angle of the central axis of the roll with respect to the central axis of the hub main body is 15°. Like the portion surrounded by a chain line γ of FIG. 10(B), a radius of curvature of a cross-sectional shape of the tooth surface of the tooth 32 is reduced, and like the portion surrounded by a chain line ε, a step portion 35 is formed, and straightness of the cross-sectional shape of the tooth surface of the tooth 32 is decreased. When the straightness is decreased, in a state in which the hub-side face spline 21 is meshed with the joint-side face spline 26 formed on the outer ring 2 for a constant velocity joint (see FIG. 5), an abutting area between the tooth surfaces of the teeth 32 that constitute the hub-side face spline 21 and the teeth that constitute the joint-side face spline 26 is reduced, and it may be difficult to secure durability of the meshing section between the hub-side face spline 21 and the joint-side face spline 26, and therefore durability of the entire wheel-supporting rolling bearing unit 1.

CITATION LIST

Patent Literature

[Patent Literature 1]
Japanese Unexamined Patent Application, First Publication No. 2009-292422

SUMMARY OF INVENTION

Technical Problem

An object of the present invention is to provide a method for manufacturing a rolling bearing unit capable of suppressing manufacturing cost while securing durability of the rolling bearing unit.

Solution to Problem

In an aspect of the present invention, a rolling bearing unit includes a hub main body and an inner ring.

The hub main body has an inner ring track that is provided at one side in an axial direction and that is formed on an outer circumferential surface of an intermediate section of the hub main body in the axial direction.

In addition, the inner ring has an inner ring track on an outer circumferential surface of the inner ring at other side in the axial direction and that is fitted onto a portion of the hub main body close to other end of the hub main body in the axial direction.

Then, the inner ring is supported by and fixed to the hub main body by pressing other end surface of the inner ring in the axial direction with a caulking section formed by plastically deforming a cylindrical section, formed on the other end portion of the hub main body in the axial direction, outward in the radial direction. In addition, a hub-side face spline that is a concavo-convex section in a circumferential direction is formed on other end surface of the caulking section in the axial direction.

The rolling bearing unit that is a target of the manufacturing method for the present invention further includes, more specifically, an outer ring having a plurality of rows of outer ring tracks on an inner circumferential surface thereof, and rolling elements disposed between both of the outer ring tracks and both of the inner ring tracks such that a plurality of rolling elements are rollably installed at each row.

In addition, the method for manufacturing the rolling bearing unit of the present invention includes forming the hub-side face spline that is a concavo-convex section in the circumferential direction by performing rotary forging of rotating a roll about a central axis of the hub main body in a state in which a processing surface of the roll is pressed against the other end surface of the caulking section in the axial direction, the roll is rotatably supported about a central axis of the roll and the roll has a tip surface on which the processing surface is formed where concave sections and convex sections are alternately disposed throughout the circumference, the central axis of the roll being inclined with respect to the central axis of the hub main body.

In the method for manufacturing the rolling bearing unit of the present invention, during the rotary forging, in a stage in which a tooth depth of the hub-side face spline is increased to such an extent as to be engageable with the concave sections and the convex sections formed on the processing surface of the roll according to at least the rotary forging, the rotary forging is performed on the other end surface of the caulking section in the axial direction by periodically changing an interval between a roll support section that supports the roll and the stage that supports (holds) the hub main body and by rotating the roll about the central axis of the hub main body in a state in which the processing surface of the roll is pressed against the other end surface of the caulking section in the axial direction. Specifically, the interval is periodically changed so that the interval is minimized in a state in which one of a central position (a central position of the roll in the circumferential direction) among the concave section and the convex section that constitute the processing surface of the roll is pressed toward the other end surface of the caulking section in the axial direction, and the interval is maximized in a state in which the other central position among the concave section and the convex section is pressed against the other end surface of the caulking section in the axial direction.

In other words, the interval is periodically changed so that the interval is minimized in a state in which a virtual line, parallel to the central axis of the roll and passing through one of a central position among the concave section and the convex section, is present in a virtual plane including the central axis of the hub main body and the central axis of the roll, and the interval is maximized in a state in which a virtual line, parallel to the central axis of the roll and passing through the other central position among the concave section and the conves section, is present in the virtual plane including the central axis of the hub main body and the central axis of the roll.

When the rolling bearing unit of the present invention is performed, specifically, for example, the stage is periodically reciprocated in the axial direction of the hub main body.

In an example, an inclined angle of the central axis of the roll with respect to the central axis of the hub main body may be 15° or less.

In this case, preferably, an inclined angle of the central axis of the roll with respect to the central axis of the hub main body may be 30° or less.

In addition, in the above-mentioned example, the number of convex sections that constitute the processing surface may be equal to the number of teeth that constitute the hub-side face spline.

Advantageous Effects of Invention

According to the aspect of the present invention, it is possible to provide a method for manufacturing a rolling bearing unit capable of suppressing manufacturing cost while securing durability of the rolling bearing unit.

In addition, according to the aspect of the present invention, in a state in which the roll is pressed toward the end surface of the caulking section in the axial direction in at least a finishing stage of the rotary forging for forming the hub-side face spline on the end surface of the caulking section in the axial direction, the roll is rotated about the central axis of the hub main body while periodically varying an interval between a roll support section that supports the roll and a support stage that supports the hub main body. Accordingly, even when the inclined angle of the central axis of the roll with respect to the central axis of the hub main body is increased, local abutting between the processing surface of the roll and the end surface of the caulking section in the axial direction, such that the tooth surfaces of the teeth that constitute the hub-side face spline are locally plastically deformed, can be prevented. Accordingly, straightness of the teeth can be improved and durability of the rolling bearing unit can be sufficiently secured. In addition, a force pressing the processing surface of the roll toward the end surface of the caulking section in the axial direction can be suppressed from being uselessly increased, an increase in size of a processing machine used in the rotary forging can be prevented, and an increase in manufacturing cost is suppressed.

DESCRIPTION OF EMBODIMENTS

Figure 5:
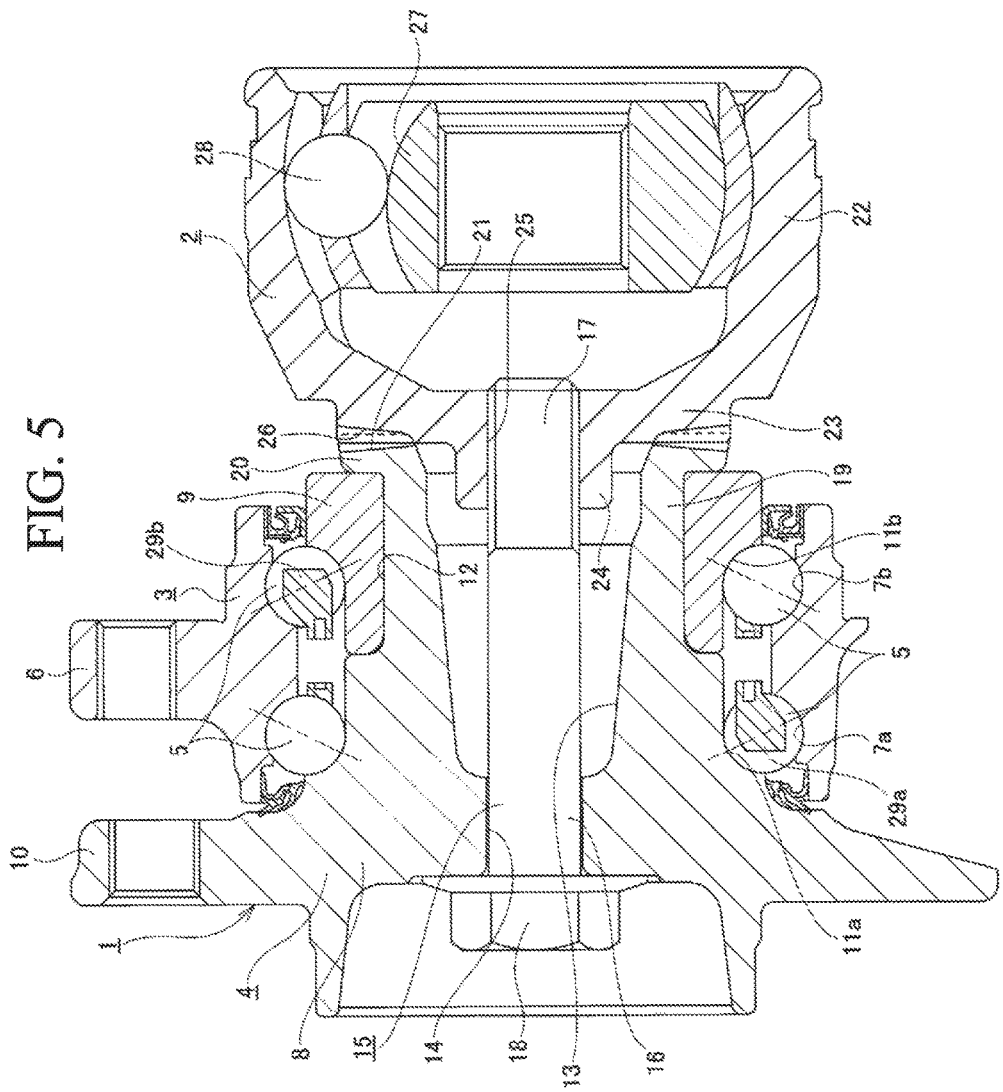
FIG. 5 is a cross-sectional view showing an example of a conventional structure of a wheel-driving bearing unit.
Figure 6:
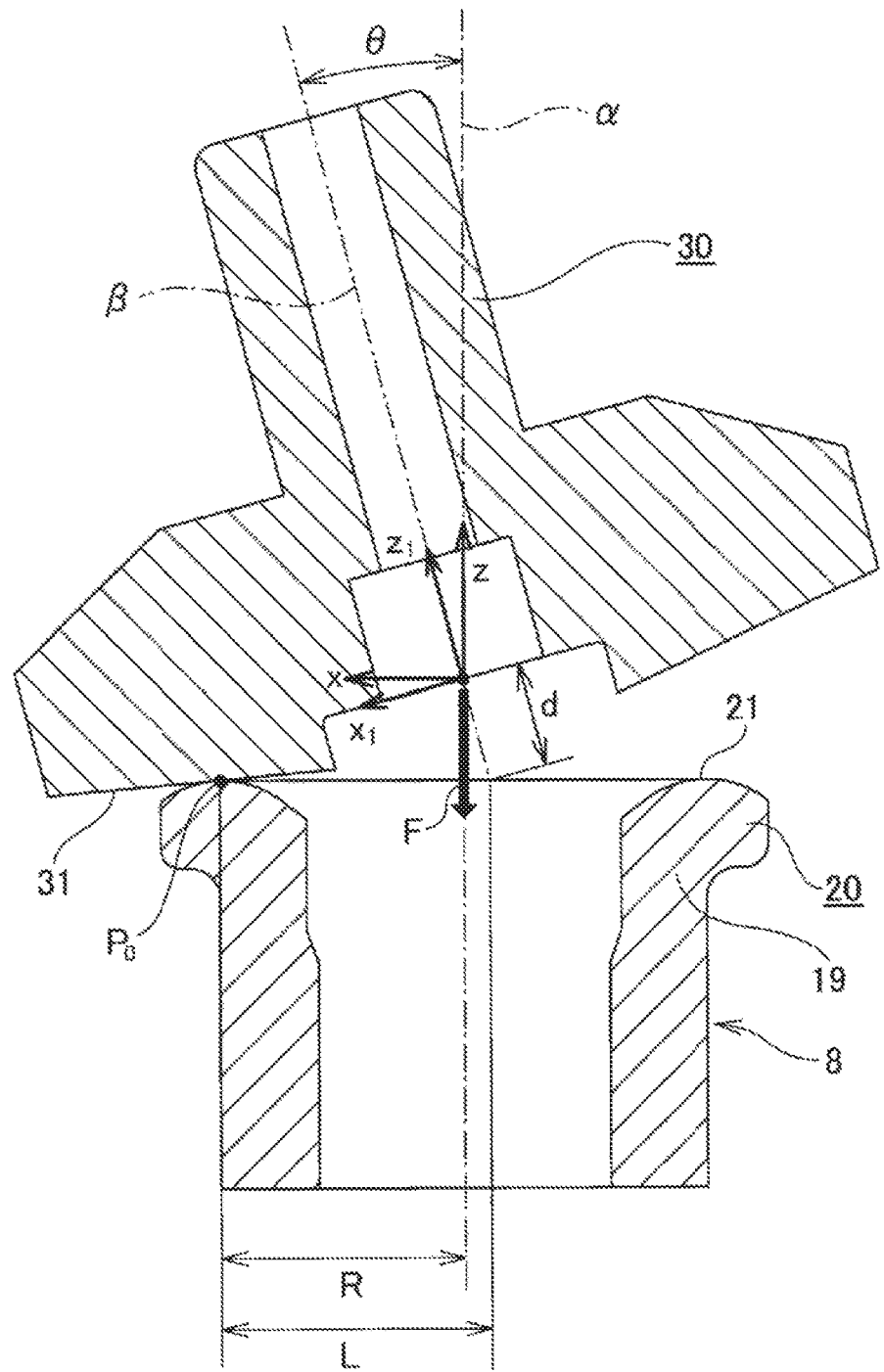
FIG. 6 is a cross-sectional view showing an example of a method for manufacturing a wheel-driving bearing unit in the related art.

A first embodiment of the present invention will be described with reference to FIGS. 1 to 4 in addition to FIGS. 5 and 6, which are described above. Further, a feature of the present invention including the present example is a method of forming a hub-side face spline on the other end surface of a caulking section of a hub main body in an axial direction that constitutes a rolling bearing unit in order to suppress manufacturing cost while securing durability of the wheel supporting rolling bearing unit 1. Since a sequence or the like of manufacturing members constituting the wheel supporting rolling bearing unit 1 by performing plastic working such as forging or the like, cutting such as lathe turning or the like, and finishing such as polishing or the like on a metal material are the same as in the method of manufacturing the rolling bearing unit widely known in the related art, description thereof will be omitted.

Even in the case of the present example, like the above-mentioned manufacturing method in the related art, the outer ring 3 is disposed around the hub main body 8, and the plurality of rolling elements 5 and 5 are installed between the outer ring track 7a provided at one side in the axial direction and the inner ring track 11a provided at one side in the axial direction while being held by the holder 29a (see FIG. 5) provided at one side in the axial direction. Next, the rolling elements 5 and 5 are installed around the inner ring track 11b provided at the other side in the axial direction formed on the outer circumferential surface of the inner ring 9 while being held by the holder 29b provided at the other side in the axial direction. In this state, the inner ring 9 is fastened and fitted onto the small diameter step section 12 formed on the other end portion of the hub main body 8 in the axial direction.

Then, according to the on-fitting work, the rolling contact surfaces of the rolling elements 5 and 5 provided at the other side row in the axial direction are made to abut the outer ring track 7b provided at the other side in the axial direction formed on the inner circumferential surface of the portion close to the other end of the outer ring 3 in the axial direction. Next, the cylindrical section 19 formed on the other end portion of the hub main body 8 in the axial direction is plastically deformed outward in the radial direction to form the caulking section 20. Then, the other end surface of the inner ring 9 in the axial direction is pressed down in the axial direction by the caulking section 20, and the inner ring 9 is fixed to the hub main body 8. Further, rotary forging is performed on the other end surface of the caulking section 20 in the axial direction to form the hub-side face spline 21.

Figure 1:
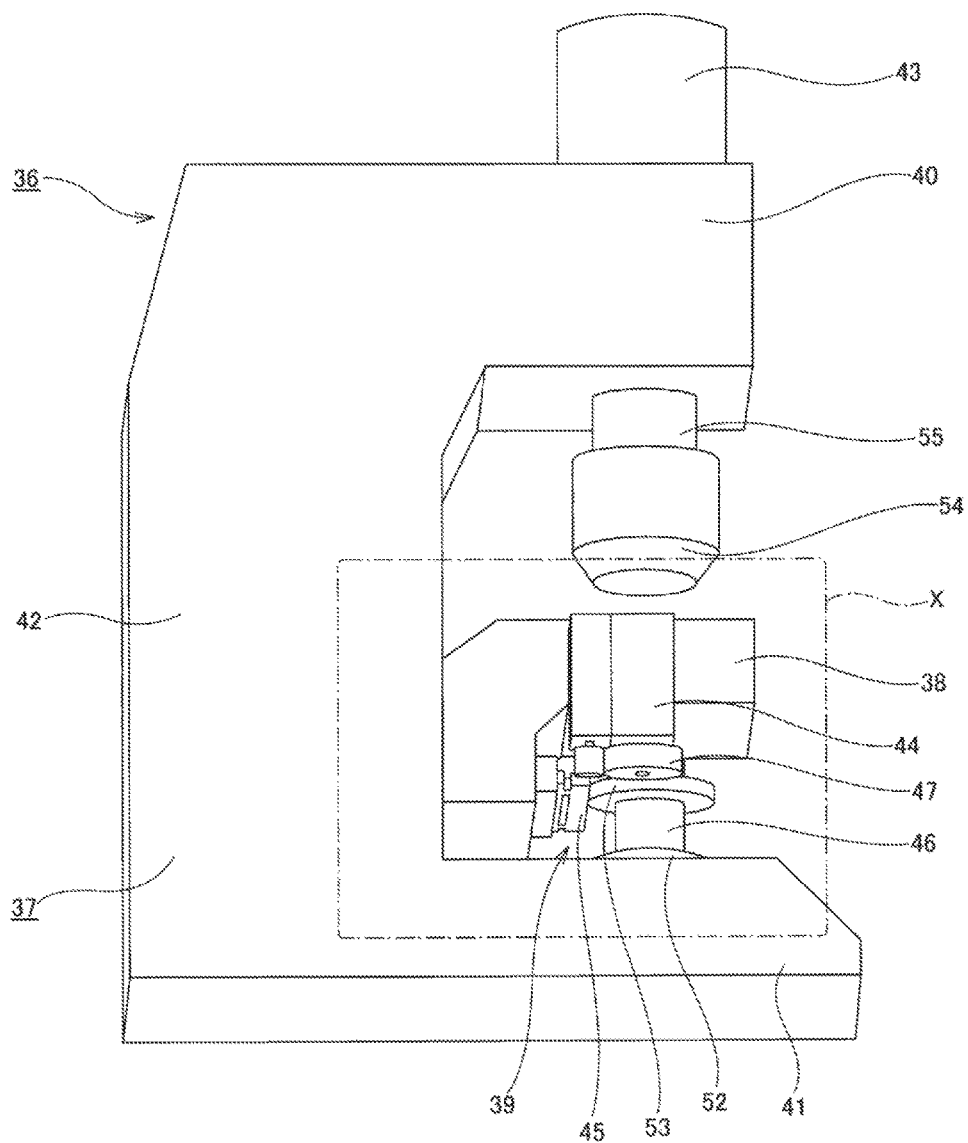
FIG. 1 is a perspective view showing an example of a swing press apparatus that can perform a manufacturing method for a first embodiment of the present invention.
Figure 2:
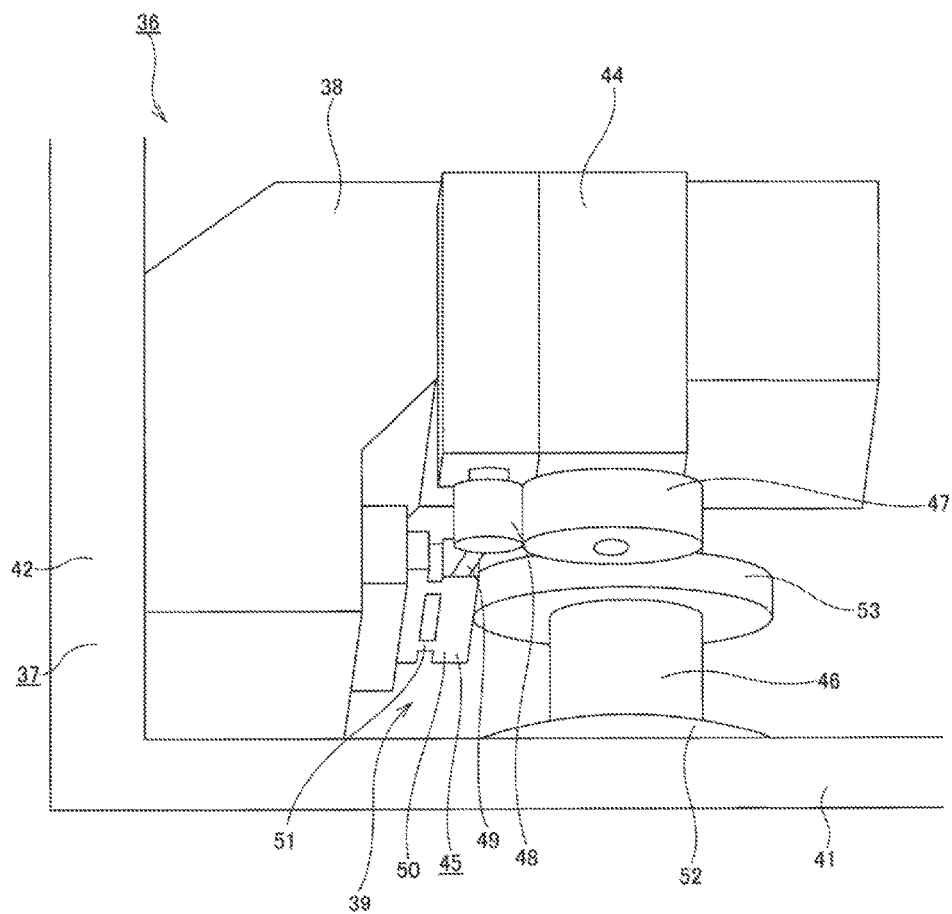
FIG. 2 is an enlarged view of a portion X of FIG. 1.

Rotary forging for forming the hub-side face spline 21 is performed using a swing press apparatus 36 shown in FIGS. 1 to 2. The swing press apparatus 36 includes a main body 37 formed in a substantially reversed C shape (a substantially C shape or a substantially U shape) as a whole, a stage 38 configured to support (place) the hub main body 8, a roll attachment section 54, and an oscillation mechanism 39.

The stage 38 is supported in a vertical direction to be displaceably with respect to a bridge section 42 that connects an upper arm section 40 installed on an upper end portion of the main body 37 and a base 41 installed on a lower end section. Further, during the rotary forging, the hub main body 8 is supported with respect to the stage 38 without wobbling in a state in which the axial direction of the central axis α (see FIG. 6) of the hub main body 8 coincides with the vertical direction.

Figure 3:
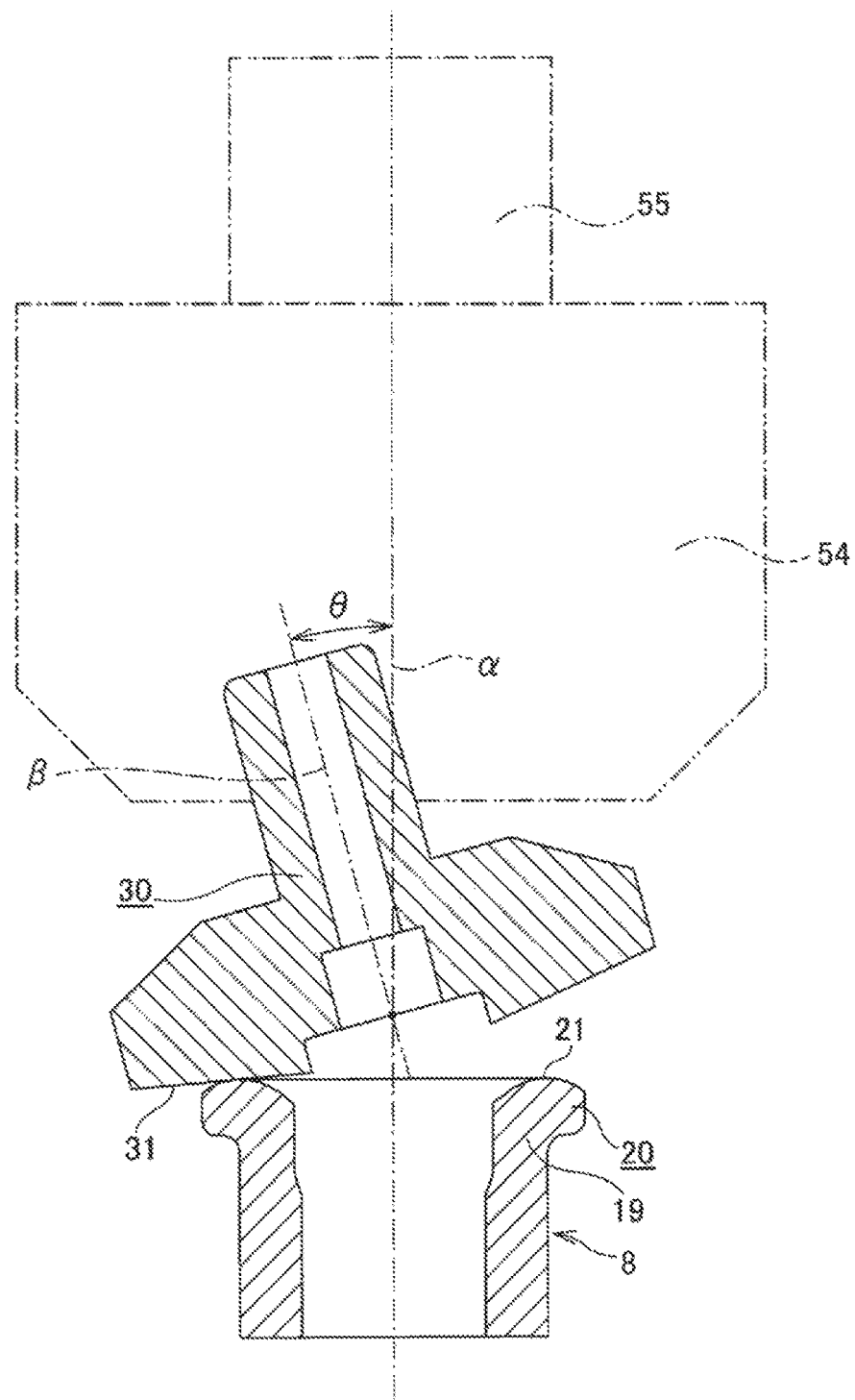
FIG. 3 is a substantially cross-sectional view showing a roll attachment section, a roll and a hub main body in a state in which the roll is attached to the roll attachment section.

The roll attachment section 54 is supported at a tip portion (a lower end section of FIG. 1) of a spindle shaft 55 rotatably supported to be driven by a roll driving motor 43 attached to an upper surface of the upper arm section 40. Then, as shown in FIG. 3, the roll 30 is supported at the tip portion of the roll attachment section 54 via a plurality of rolling bearings (not shown) to be rotatably to be driven about a central axis of the roll driving motor 43 (a central axis of the spindle shaft 55), and rotatably about a rotation axis β thereof inclined with respect to the central axis α of the hub main body 8 supported at the stage 38 (i.e., with respect to the vertical direction) by a predetermined angle θ.

Further, the central axis α of the hub main body 8 is coaxial with a central axis of the roll driving motor 43. In addition, the predetermined angle θ is 15° or more and 30° or less (15≤θ≤30). The processing surface 31 in which the concave section 34 and the convex sections 33 and 33 are alternately disposed throughout the circumference is formed on the tip surface of the roll 30. The number of the convex sections 33 and 33 is equal to the number of the teeth 32 that constitute the hub-side face spline 21 formed on the other end surface of the caulking section 20 in the axial direction.

The oscillation mechanism 39 is provided to periodically reciprocate the stage 38 in the vertical direction and is formed between the main body 37 and the stage 38 thereof. In the case of the example, the oscillation mechanism 39 includes a servo motor 44, an exchange mechanism 45 configured to convert rotation of an output shaft of the servo motor 44 into reciprocation, and a screw shaft 46.

The exchange mechanism 45 includes a driving-side gear 47 supported at and fixed to the output shaft of the servo motor 44, an intermediate gear 48 meshed with the driving-side gear 47, a link arm 49, and a rack 50. One end portion of the link arm 49 is swingably connected to a portion of the intermediate gear 48 deviated from a rotation center thereof in the radial direction at a portion of an end surface of the intermediate gear 48, and the other end portion of the link arm 49 is swingably connected to one end portion of the rack 50. The rack 50 is displaceably supported in a horizontal direction (a front-rear direction in FIGS. 1 and 2) by a linear motion bearing (a linear guide) 51 at a side surface of the stage 38. Accordingly, when the driving-side gear 47 is rotated and driven by the servo motor 44 and the intermediate gear 48 is rotated, the link arm 49 is pushed and pulled to reciprocate the rack 50 in the horizontal direction.

The screw shaft 46 has a portion close to a lower end thereof screwed into a nut part 52 formed on an upper surface of the base 41 and an intermediate section configured to support and fix a driven-side gear 53 meshed with the rack 50 while being disposed in the vertical direction. An upper end portion of the screw shaft 46 is connected to the stage 38. Accordingly, when the rack 50 reciprocates in the horizontal direction as the servo motor 44 is driven, the screw shaft 46 reciprocally rotates on the basis of meshed engagement between the rack 50 and the driven-side gear 53. Then, the stage 38 is periodically reciprocated in the vertical direction by periodically reciprocating the screw shaft 46 in the vertical direction on the basis of screwed engagement between the screw shaft 46 and the nut part 52. Further, the screw shaft 46 is, for example, a ball screw shaft having a male ball screw groove formed in an outer circumferential surface thereof, and the ball screw shaft may be screwed into the nut part having the female ball screw groove formed in the inner circumferential surface via a plurality of balls.

When the rotary forging is performed using the above-mentioned swing press apparatus 36, in a state in which the central axis α of the hub main body 8 coincides with the vertical direction (in a state in which one end of the hub main body 8 in the axial direction is directed downward and the other end in the axial direction is directed upward), the hub main body 8 is supported (placed) on the stage 38. Then, the spindle shaft 55 is lowered, and the processing surface 31 of the roll 30 attached to the roll attachment section 54 installed on the tip portion of the spindle shaft 55 is pressed on the other end surface of the caulking section 20 in the axial direction with a large force (a pressing force) F. In this state, the roll 30 is rotated about the central axis α of the hub main body 8 by the roll driving motor 43, and the stage 38 is periodically reciprocated in the vertical direction by rotating and driving the servo motor 44.

However, the roll 30 is rotated about the central axis α in a state in which the stage 38 is fixed (without reciprocation in the vertical direction), the hub-side face spline 21 (i.e., a concavo-convex section in the circumferential direction to become the hub-side face spline 21) is formed on the other end surface of the caulking section 20 in the axial direction to some extent (i.e., to an extent that the hub-side face spline 21 has a tooth depth to enable engagement between the concave section 34 and the convex sections 33 and 33 formed on the processing surface 31 of the roll 30), and then, the stage 38 may be periodically reciprocated in the vertical direction by rotating and driving the servo motor 44.

In any case, the roll 30 is rotatably supported about the central axis β thereof. Accordingly, in a state before the hub-side face spline 21 (i.e., a concavo-convex section in the circumferential direction to become the hub-side face spline 21) is formed on the other end surface of the caulking section 20 in the axial direction, when the roll 30 is rotated about the central axis α of the hub main body 8, the roll 30 is rotated (self-rotated) about the central axis β thereof on the basis of frictional engagement between the tooth tip of the tooth formed on the processing surface 31 and the other end surface of the caulking section 20 in the axial direction.

Meanwhile, when the roll 30 is rotated about the central axis α of the hub main body 8 after the hub-side face spline 21 is formed to some extent (a tooth depth of the hub-side face spline 21 is increased to some extent), the roll 30 is self-rotated on the basis of engagement (meshing) between the concave section 34 and the convex sections 33 and 33 that constitute the processing surface 31 and the hub-side face spline 21. Then, the tooth depth of the tooth 32 that constitute the hub-side face spline 21 is further increased to complete the processing.

In particular, in the case of the example, a period of the reciprocation is restricted as follows. That is, as shown in FIG. 9(C), in a state in which a central position of one concave section 34 (a central position of the roll 30 in the circumferential direction) of the plurality of concave sections 34 that constitutes the processing surface 31 of the roll 30 is pressed toward the other end surface of the caulking section 20 in the axial direction, as shown by a point a in FIG. 4, the stage 38 is disposed at the uppermost position.

Figure 4:
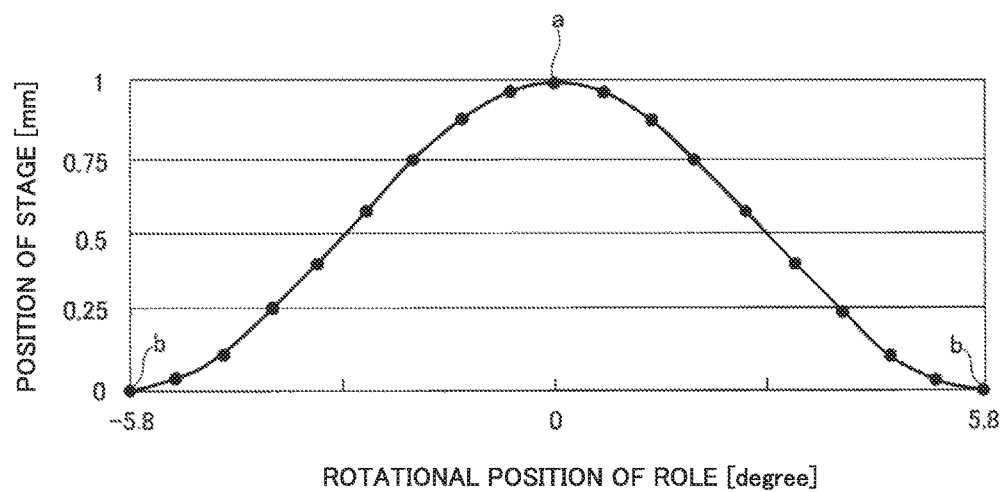
FIG. 4 is a diagram showing a relation between a rotation position of the roll about a central axis of the hub main body and a position of a state of the hub main body in the axial direction.
Figure 9:
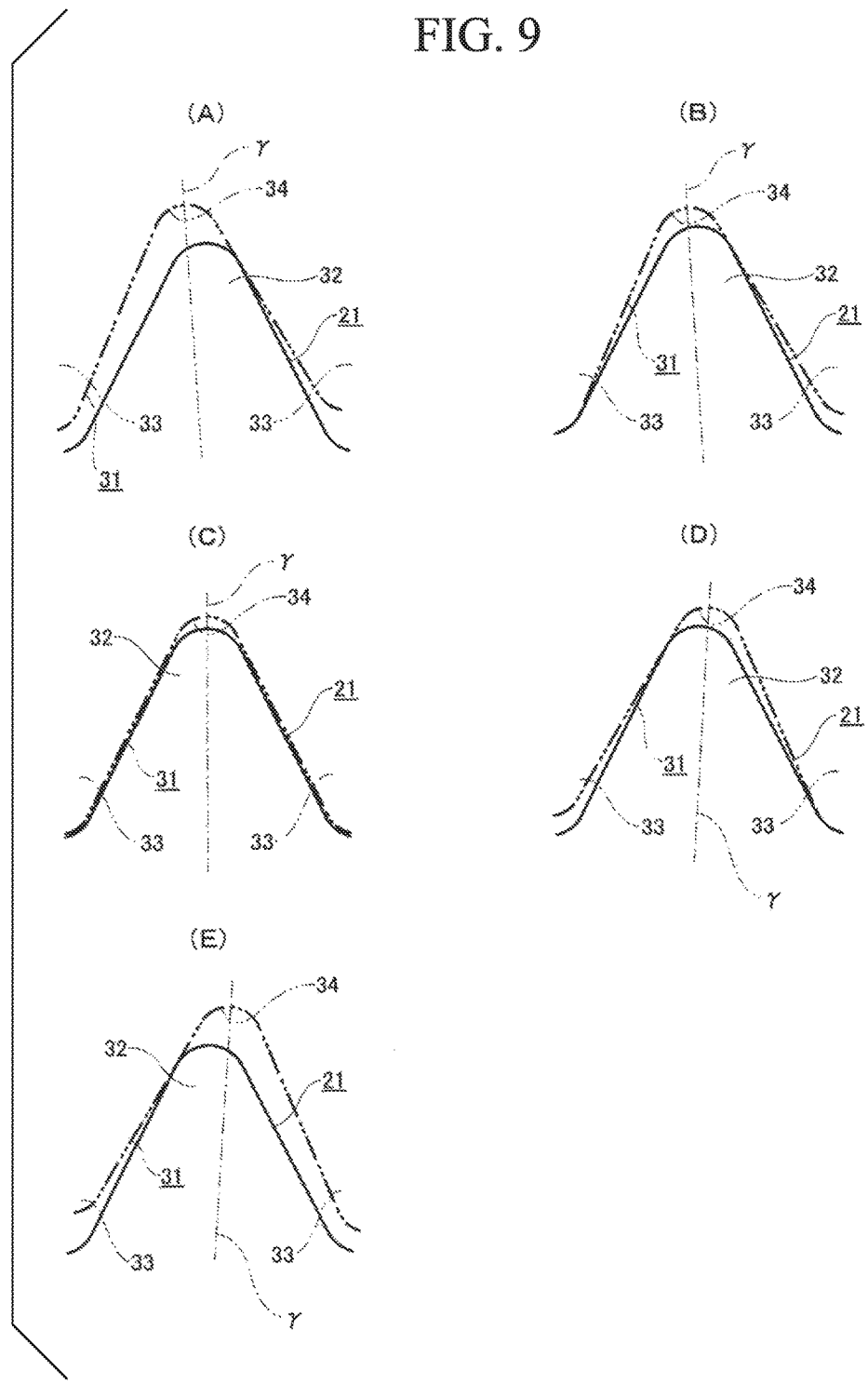
FIG. 9 is a schematic view showing a state in which a hub-side face spline is formed by rotary forging.
Figure 10:
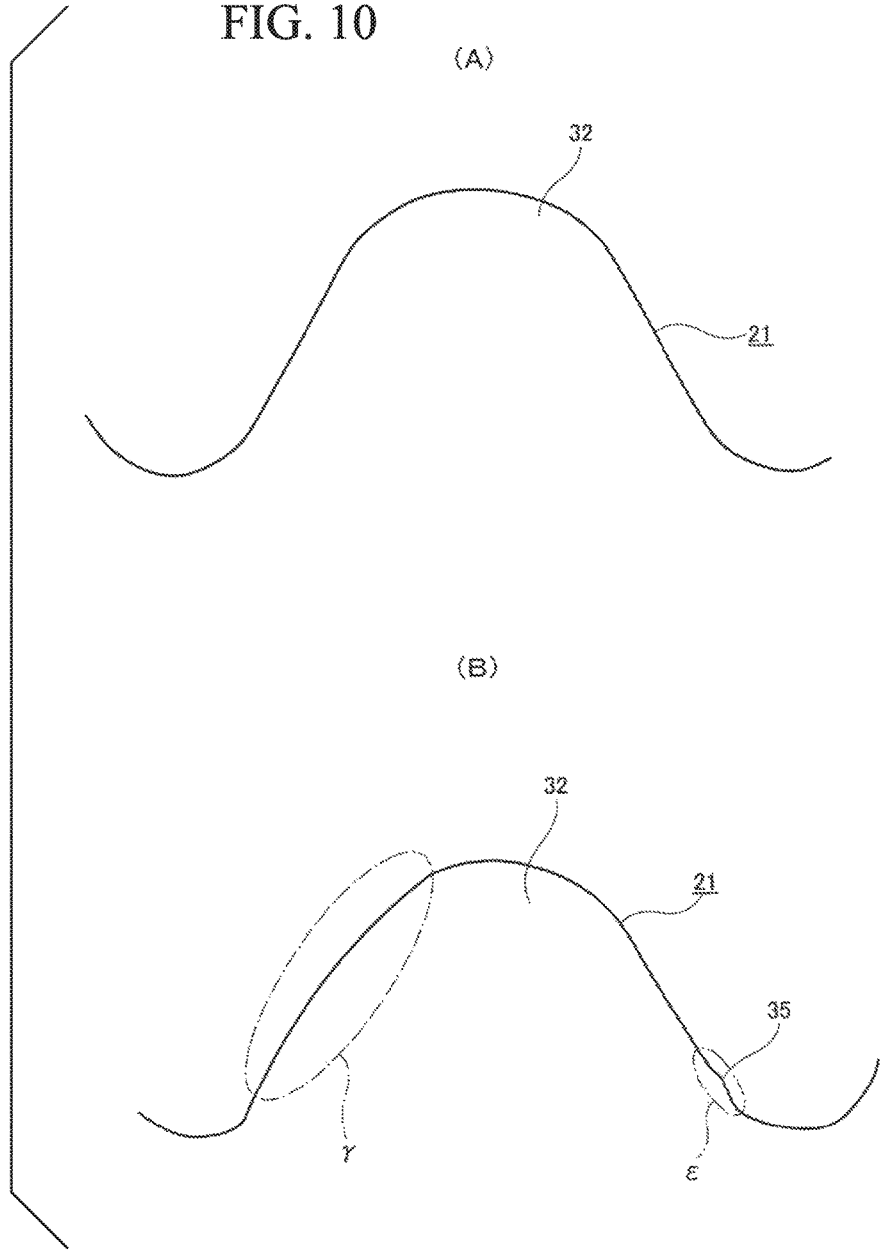
FIG. 10 is a schematic view showing a face spline tooth formed by rotary forging.

Meanwhile, as shown in FIG. 9(B) or 9(D), in a state in which the central position of the one convex section 33, among the plurality of convex sections 33 that constitutes the processing surface 31, is pressed toward the other end surface of the caulking section 20 in the axial direction, as shown in a point b in FIG. 4, the stage 38 is disposed at the lowermost position. In other words, in a state in which the virtual line γ parallel to the central axis β of the roll 30 and passing through the central position of the one concave section 34 is present in a virtual plane including the central axis α of the hub main body 8 and the central axis β of the roll 30, the stage 38 is disposed at the uppermost position. Meanwhile, in a state in which a virtual line parallel to the central axis β of the roll 30 and passing through the central position of the one convex section 33 is present in a virtual plane including the central axis α of the hub main body 8 and the central axis β of the roll 30 thereof, the stage 38 is disposed at the lowermost position.

Accordingly, as shown in FIGS. 9(B) and 9(D), the processing surface 31 of the roll 30 and the other end surface of the caulking section 20 in the axial direction are separated from each other, or, the processing surface 31 of the roll 30 is not pressed strongly against the other end surface of the caulking section 20 in the axial direction. Further, in the case of the present example, in a state in which the central position of the one concave section 34 is pressed toward the other end surface of the caulking section 20 in the axial direction, as shown in FIG. 9(C), the tooth surface of the tooth 32 formed by the one concave section 34 (i.e., a side surface of the convex section in the circumferential direction to become the tooth 32) is parallel to a side surface of the one concave section 34 in the circumferential direction that abuts the tooth surface of the tooth 32.

Further, when the roll 30 is further rotated about the central axis α of the hub main body 8 from a state shown in FIG. 9(D), the concave section 34 present close to a front side of the one convex section 33 in a revolution direction of the roll 30 is pressed toward the other end surface of the caulking section 20 in the axial direction (a state shown in FIG. 9(E)). In this state, the stage 38 is disposed at the uppermost position. That is, the stage 38 reciprocates in the vertical direction whenever the roll 30 is rotated to an extent of an angle corresponding to one of the teeth 32 that constitute the hub-side face spline 21 about the central axis α of the hub main body 8 (an angle obtained by dividing 360 degrees by the number of the teeth 32 that constitute the hub-side face spline 21).

Further, a lateral axis of FIG. 4 shows a rotation (revolution) angle of the roll 30 (a rotation position of the roll) by setting a state in which a central position of the one concave section 34 in the circumferential direction is pressed toward the other end surface of the caulking section 20 in the axial direction to zero. A longitudinal axis of FIG. 4 shows a position of the stage 38 in the vertical direction by setting a state in which the stage 38 is disposed at the lowermost position to zero.

A period (a vibration frequency) of reciprocation of the stage 38 in the vertical direction is, for example, 103 to 155 [Hz], when the number of the teeth 32 that constitutes the hub-side face spline 21 is 31 and a rotation number (a rotation speed) of the roll 30 about the central axis α of the hub main body 8 is 200 to 300 [rpm]. The vibration frequency of the reciprocation is restricted by adjusting the rotation number (the rotation speed) of the servo motor 44 that constitutes the oscillation mechanism 39. That is, when a gear ratio between the intermediate gear 48 and the driving-side gear 47 is 5 to 10, a rotation speed of the servo motor 44 is set at 1000 to 2000 [rpm].

Further, while a movement amount (a stroke) of reciprocation of the stage 38 in the vertical direction is different according to a tooth depth or the like of the teeth 32 that constitute the hub-side face spline 21 to be formed, the movement amount is, for example, set to about 0.1 to 1.0 [mm] when a conventional wheel supporting rolling bearing unit for an automobile is manufactured.

In the case of the present example, the rotary forging for forming the hub-side face spline 21 on the other end surface of the caulking section 20 in the axial direction is performed by rotating the roll 30 about the central axis α of the hub main body 8 while periodically reciprocating the stage 38 that supports the hub main body 8 in the vertical direction in a state in which the processing surface 31 of the roll 30 is pressed toward the other end surface of the caulking section 20 in the axial direction.

That is, in a state in which an inclined angle of the side surface of the concave section 34 in the circumferential direction with respect to the tooth surface of the tooth 32 is increased, the stage 38 is disposed downward in the vertical direction. Accordingly, even when the inclined angle θ of the central axis β of the roll 30 with respect to the central axis α of the hub main body 8 is increased (the inclined angle θ is 15° or more), local abutting between the processing surface 31 of the roll 30 and the other end surface of the caulking section 20 in the axial direction such as local plastic deformation (pressing) of the tooth surface of the tooth 32 is prevented. Accordingly, straightness of the cross-sectional shape of the tooth 32 can be improved, and in a state in which the hub-side face spline 21 is meshed with the joint-side face spline 26 (see FIG. 5) formed on the outer ring 2 for a constant velocity joint, an abutting area between the tooth surfaces of the teeth 32 that constitute the hub-side face spline 21 and the teeth that constitute the joint-side face spline 26 can be sufficiently increased. As a result, durability of the meshing section between the hub-side face spline 21 and the joint-side face spline 26 and thus the entire wheel supporting rolling bearing unit 1 can be sufficiently secured. In addition, since the inclined angle θ can be increased (the inclined angle θ can be 15° or more), a force (a pressing force) F of pressing the processing surface 31 of the roll 30 toward the other end surface of the caulking section 20 in the axial direction can be prevented from being excessively increased. As a result, the swing press apparatus 36 can be prevented from being uselessly increased in size, and an increase in manufacturing cost of the wheel supporting rolling bearing unit 1 is suppressed.

Figure 7:
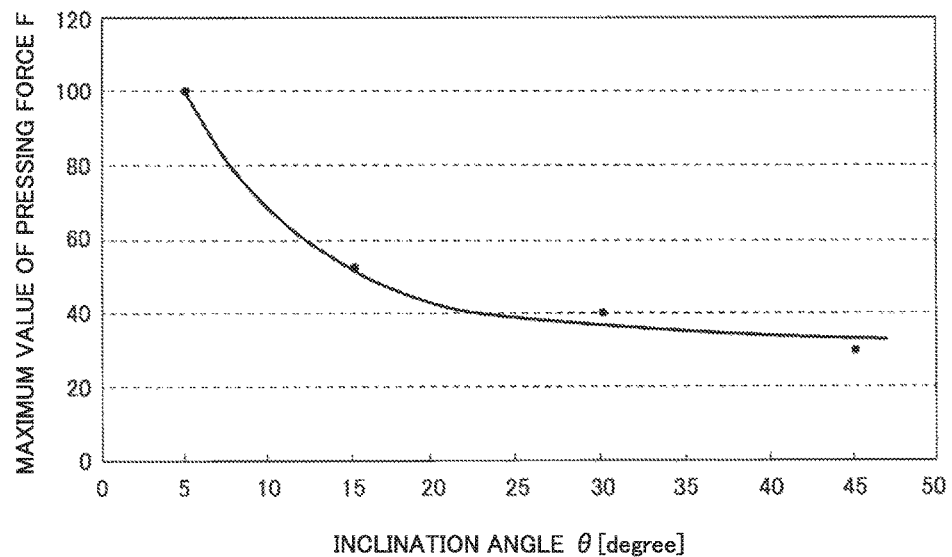
FIG. 7 is a diagram showing a relation between an inclined angle of a central axis of a roll with respect to a central axis of a hub main body and a maximum value of a pressing force.
Figure 8:
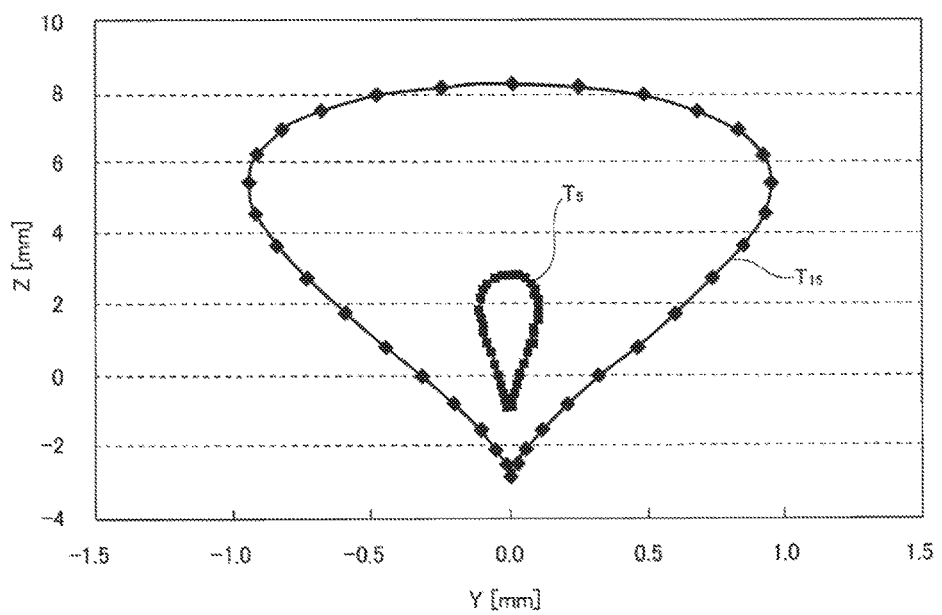
FIG. 8 is a view showing a trajectory drawn by an arbitrary point P on a processing surface of the roll.

Further, as will be apparent from FIG. 7, when the inclined angle θ of the central axis β of the roll 30 with respect to the central axis α of the hub main body 8 exceeds 30°, the abutting area between the processing surface 31 of the roll 30 and the other end surface of the caulking section 20 in the axial direction is excessively reduced. As a result, during the rotary forging, the abutting surface pressure between the tip surfaces of the convex sections 33 and 33 that constitute the processing surface 31 and the other end surface of the caulking section 20 in the axial direction is excessively increased, and it may be difficult to secure durability of the processing surface 31 of the roll 30. Here, in the case of the present example, the inclined angle θ is 30° or less.

In addition, when the present invention is performed, a synchronization mechanism configured to synchronize rotation of the roll 30 about the central axis α of the hub main body 8 and reciprocation of the stage 38 may be installed regardless of the sliding in the circumferential direction generated in the engaging section (a frictional engaging section or a meshing section) between the processing surface 31 and the other end surface of the caulking section 20 in the axial direction. That is, the sliding in the circumferential direction is detected by a sensor, and the servo motor 44 is controlled on the basis of the detected result. Specifically, when the sliding in the circumferential direction occurs, a rotation speed of the servo motor 44 is reduced, or rotation of the servo motor 44 is stopped.

In addition, an self-rotation enforcing means configured to forcibly rotate the roll 30 about the central axis β thereof in a direction opposite to a rotation direction about the central axis α of the hub main body 8 may be installed in accordance with the rotation of the roll 30 about the central axis α of the hub main body 8 during the rotary forging. For example, the self-rotation enforcing means can rotate the roll 30 about the central axis β thereof according to rotation of the roll 30 about the central axis α of the hub main body 8 by forming a guide tooth that is a concavo-convex section in the circumferential direction on a portion surrounding the other end surface of the caulking section 20 in the axial direction and meshing the guide tooth with portions of the convex sections 33 and 33 that constitutes the processing surface 31 of the roll 30 in a state in which the hub main body 8 is supported on the stage 38.

In addition, when the present invention is performed, contrary to the above-mentioned first embodiment, in a state in which a central position of one convex section 33 among the plurality of convex sections 33 and 33 that constitute the processing surface 31 of the roll 30 is pressed toward the other end surface of the caulking section 20 in the axial direction, the stage 38 is disposed at the uppermost position, and in a state in which a central position of one concave section 34 among the plurality of concave sections 34 that constitutes the pre-processing surface 31 is pressed toward the other end surface of the caulking section 20 in the axial direction, the stage 38 may be disposed at the lowermost position. In this case, in a state in which the central position of the one convex section 33 is pressed toward the other end surface of the caulking section 20 in the axial direction, the tooth surface of the tooth 32 formed by the concave section 34 (i.e., the side surface of the convex section in the circumferential direction to become the tooth 32) is parallel to the side surface of the concave section 34 in the circumferential direction abuttings the tooth surface of the tooth 32.

REFERENCE SIGNS LIST

1 Wheel supporting bearing unit
2 Outer ring for constant velocity joint
3 Outer ring
4 Hub
5 Rolling element
6 Stationary-side flange
7a, 7b Outer ring track
8 Hub main body
9 Inner ring
10 Rotation-side flange
11a, 11b Inner ring track
12 Small diameter step section
13 Center hole
14 Small diameter section
15 Bolt
16 Rod section
17 Male screw portion
18 Head portion
19 Cylindrical section
20 Caulking section
21 Hub-side face spline
22 Mouth section
23 End wall section
24 Shaft section
25 Screw hole
26 Joint-side face spline
27 Inner ring for constant velocity joint
28 Ball
29a, 29b Holder
30 Roll
31 Processing surface
32 Tooth
33 Convex section
34 Concave section
35 Step portion
36 Swing press apparatus
37 Main body
38 Stage
39 Oscillation mechanism
40 Upper arm section
41 Base
42 Bridge section
43 Roll driving motor
44 Servo motor
45 Exchange mechanism
46 Screw shaft
47 Driving-side gear
48 Intermediate gear
49 Link arm
50 Rack
51 Linear motion bearing
52 Nut part
53 Driven-side gear
54 Roll attachment section
55 Spindle shaft

The invention claimed is:
1. A method for manufacturing a rolling bearing unit, the rolling bearing unit comprising:
a hub main body having an inner ring track that is provided at one side in an axial direction and that is formed on an outer circumferential surface of an intermediate section of the hub main body in the axial direction; and
an inner ring that has an inner ring track on an outer circumferential surface of the inner ring at an other side in the axial direction and that is fitted onto a portion of the hub main body close to an other end of the hub main body in the axial direction, wherein the inner ring is fixed to the hub main body by pressing an other end surface of the inner ring in the axial direction with a caulking section, and a hub-side face spline that is a concavo-convex section in a circumferential direction is formed on an other end surface of the caulking section in the axial direction, the caulking section being formed by plastically deforming a cylindrical section, formed on an other end portion of the hub main body in the axial direction, outward in a radial direction, the method for manufacturing a rolling bearing unit comprising:

forming the hub-side face spline on the other end surface of the caulking section in the axial direction by performing rotary forging of rotating a roll about a central axis of the hub main body in a state in which a processing surface of the roll is pressed against the other end surface of the caulking section in the axial direction, the roll being rotatably supported about a central axis of the roll and having a tip surface on which the processing surface is formed where concave sections and convex sections are alternately disposed throughout a circumference, the central axis of the roll being inclined with respect to the central axis of the hub main body, during the rotary forging, in a stage in which a tooth depth of the hub-side face spline is increased to such an extent as to be engageable with the concave sections and the convex sections formed on the processing surface of the roll according to at least the rotary forging, periodically changing an interval between a roll support section supporting the roll and a stage supporting the hub main body so that the interval is minimized in a state in which one of a central position among the concave sections and the convex sections that constitute the processing surface of the roll is pressed toward the other end surface of the caulking section in the axial direction, and the interval is maximized in a state in which other central position among the concave sections and the convex sections is pressed against the other end surface of the caulking section in the axial direction and so that the rotary forging is performed on the other end surface of the caulking section in the axial direction by rotating the roll about the central axis of the hub main body in a state in which the processing surface of the roll is pressed toward the other end surface of the caulking section in the axial direction, and forming the hub-side face spline such that a tooth surface of a tooth of the hub-side face spline is parallel to a side surface of a concave section of the concave sections of the processing surface of the roll.

2. The method for manufacturing the rolling bearing unit according to claim 1, wherein an inclined angle of the central axis of the roll with respect to the central axis of the hub main body is 15° or more.

3. The method for manufacturing the rolling bearing unit according to claim 1, wherein a number of convex sections that constitute the processing surface is equal to a number of teeth that constitute the hub-side face spline.

4. The method for manufacturing the rolling bearing unit according to claim 2, wherein a number of convex sections that constitute the processing surface is equal to a number of teeth that constitute the hub-side face spline.

5. The method for manufacturing the rolling bearing unit according to claim 1, further comprising:

periodically changing the interval between the roll support section supporting the roll and the stage supporting the hub main body to suppress local abutting between the processing surface of the roll and the other end surface of the caulking section.

6. A method for manufacturing a vehicle including a rolling bearing unit, the rolling bearing unit comprising:

a hub main body having an inner ring track that is provided at one side in an axial direction and that is formed on an outer circumferential surface of an intermediate section of the hub main body in the axial direction; and an inner ring that has an inner ring track on an outer circumferential surface of the inner ring at an other side in the axial direction and that is fitted onto a portion of the hub main body close to an other end of the hub main body in the axial direction, wherein the inner ring is fixed to the hub main body by pressing an other end surface of the inner ring in the axial direction with a caulking section, and a hub-side face spline that is a concavo-convex section in a circumferential direction is formed on an other end surface of the caulking section in the axial direction, the caulking section being formed by plastically deforming a cylindrical section, formed on an other end portion of the hub main body in the axial direction, outward in a radial direction, the method for manufacturing a rolling bearing unit comprising:

forming the hub-side face spline on the other end surface of the caulking section in the axial direction by performing rotary forging of rotating a roll about a central axis of the hub main body in a state in which a processing surface of the roll is pressed against the other end surface of the caulking section in the axial direction, the roll being rotatably supported about a central axis of the roll and having a tip surface on which the processing surface is formed where concave sections and convex sections are alternately disposed throughout a circumference, the central axis of the roll being inclined with respect to the central axis of the hub main body, during the rotary forging, in a stage in which a tooth depth of the hub-side face spline is increased to such an extent as to be engageable with the concave sections and the convex sections formed on the processing surface of the roll according to at least the rotary forging, periodically changing an interval between a roll support section supporting the roll and a stage supporting the hub main body so that the interval is minimized in a state in which one of a central position among the concave sections and the convex sections that constitute the processing surface of the roll is pressed toward the other end surface of the caulking section in the axial direction, and the interval is maximized in a state in which other central position among the concave sections and the convex sections is pressed against the other end surface of the caulking section in the axial direction and so that the rotary forging is performed on the other end surface of the caulking section in the axial direction by rotating the roll about the central axis of the hub main body in a state in which the processing surface of the roll is pressed toward the other end surface of the caulking section in the axial direction, and forming the hub-side face spline such that a tooth surface of a tooth of the hub-side face spline is parallel to a side surface of a concave section of the concave sections of the processing surface of the roll, the method for manufacturing a vehicle including a rolling bearing unit comprising:

manufacturing the vehicle by incorporating the rolling bearing unit onto the vehicle.

7. A method for manufacturing a vehicle including a rolling bearing unit, the rolling bearing unit comprising:

a hub main body having an inner ring track that is provided at one side in an axial direction and that is formed on an outer circumferential surface of an intermediate section of the hub main body in the axial direction; and an inner ring that has an inner ring track on an outer circumferential surface of the inner ring at an other side in the axial direction and that is fitted onto a portion of the hub main body close to an other end of the hub main body in the axial direction, wherein the inner ring is fixed to the hub main body by pressing an other end surface of the inner ring in the axial direction with a caulking section, and a hub-side face spline that is a concavo-convex section in a circumferential direction is formed on an other end surface of the caulking section in the axial direction, the caulking section being formed by plastically deforming a cylindrical section, formed on an other end portion of the hub main body in the axial direction, outward in a radial direction, the method for manufacturing a rolling bearing unit comprising:

forming the hub-side face spline on the other end surface of the caulking section in the axial direction by performing rotary forging of rotating a roll about a central axis of the hub main body in a state in which a processing surface of the roll is pressed against the other end surface of the caulking section in the axial direction, the roll being rotatably supported about a central axis of the roll and having a tip surface on which the processing surface is formed where concave sections and convex sections are alternately disposed throughout a circumference, the central axis of the roll being inclined with respect to the central axis of the hub main body, during the rotary forging, in a stage in which a tooth depth of the hub-side face spline is increased to such an extent as to be engageable with the concave sections and the convex sections formed on the processing surface of the roll according to at least the rotary forging, periodically changing an interval between a roll support section supporting the roll and a stage supporting the hub main body so that the interval is minimized in a state in which one of a central position among the concave sections and the convex sections that constitute the processing surface of the roll is pressed toward the other end surface of the caulking section in the axial direction, and the interval is maximized in a state in which other central position among the concave sections and the convex sections is pressed against the other end surface of the caulking section in the axial direction and so that the rotary forging is performed on the other end surface of the caulking section in the axial direction by rotating the roll about the central axis of the hub main body in a state in which the processing surface of the roll is pressed toward the other end surface of the caulking section in the axial direction, and forming the hub-side face spline such that a tooth surface of a tooth of the hub-side face spline is parallel to a side surface of a concave section of the concave sections of the processing surface of the roll, wherein an inclined angle of the central axis of the roll with respect to the central axis of the hub main body is 15° or more, the method for manufacturing a vehicle including a rolling bearing unit comprising:

manufacturing the vehicle by incorporating the rolling bearing unit onto the vehicle.

8. A method for manufacturing a vehicle including a rolling bearing unit, the rolling bearing unit comprising:

a hub main body having an inner ring track that is provided at one side in an axial direction and that is formed on an outer circumferential surface of an intermediate section of the hub main body in the axial direction; and an inner ring that has an inner ring track on an outer circumferential surface of the inner ring at an other side in the axial direction and that is fitted onto a portion of the hub main body close to an other end of the hub main body in the axial direction, wherein the inner ring is fixed to the hub main body by pressing an other end surface of the inner ring in the axial direction with a caulking section, and a hub-side face spline that is a concavo-convex section in a circumferential direction is formed on an other end surface of the caulking section in the axial direction, the caulking section being formed by plastically deforming a cylindrical section, formed on an other end portion of the hub main body in the axial direction, outward in a radial direction, the method for manufacturing a rolling bearing unit comprising:

forming the hub-side face spline on the other end surface of the caulking section in the axial direction by performing rotary forging of rotating a roll about a central axis of the hub main body in a state in which a processing surface of the roll is pressed against the other end surface of the caulking section in the axial direction, the roll being rotatably supported about a central axis of the roll and having a tip surface on which the processing surface is formed where concave sections and convex sections are alternately disposed throughout a circumference, the central axis of the roll being inclined with respect to the central axis of the hub main body, during the rotary forging, in a stage in which a tooth depth of the hub-side face spline is increased to such an extent as to be engageable with the concave sections and the convex sections formed on the processing surface of the roll according to at least the rotary forging, periodically changing an interval between a roll support section supporting the roll and a stage supporting the hub main body so that the interval is minimized in a state in which one of a central position among the concave sections and the convex sections that constitute the processing surface of the roll is pressed toward the other end surface of the caulking section in the axial direction, and the interval is maximized in a state in which other central position among the concave sections and the convex sections is pressed against the other end surface of the caulking section in the axial direction and so that the rotary forging is performed on the other end surface of the caulking section in the axial direction by rotating the roll about the central axis of the hub main body in a state in which the processing surface of the roll is pressed toward the other end surface of the caulking section in the axial direction, and forming the hub-side face spline such that a tooth surface of a tooth of the hub-side face spline is parallel to a side surface of a concave section of the concave sections of the processing surface of the roll, wherein a number of convex sections that constitute the processing surface is equal to a number of teeth that constitute the hub-side face spline, the method for manufacturing a vehicle including a rolling bearing unit comprising:

manufacturing the vehicle by incorporating the rolling bearing unit onto the vehicle.

* * * * *